US008909211B2

(12) United States Patent
Huq et al.

(10) Patent No.: US 8,909,211 B2
(45) Date of Patent: Dec. 9, 2014

(54) REMOTE CONTROL OF DEVICES UTILIZING A MOBILE NETWORK

(75) Inventors: Rana Huq, San Diego, CA (US); Brian K. Thompson, Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1147 days.

(21) Appl. No.: 12/255,409

(22) Filed: Oct. 21, 2008

(65) Prior Publication Data
US 2010/0099396 A1    Apr. 22, 2010

(51) Int. Cl.
*H04M 3/00* (2006.01)
*H04W 8/24* (2009.01)
*H04L 29/08* (2006.01)

(52) U.S. Cl.
CPC ............. *H04L 67/125* (2013.01); *H04W 8/245* (2013.01); *H04L 67/14* (2013.01); *H04L 67/04* (2013.01)
USPC ........ 455/420; 455/419; 455/435.1; 709/217; 709/219

(58) Field of Classification Search
USPC ................ 455/419, 420, 435.1; 709/217, 219
See application file for complete search history.

(56) References Cited

U.S. PATENT DOCUMENTS

| 6,771,635 | B1 | 8/2004 | Vilander et al. | |
| 7,024,161 | B1 * | 4/2006 | LaMedica, Jr. | ............ 455/67.11 |
| 7,822,816 | B2 * | 10/2010 | Payne | ............................ 709/206 |
| 2005/0054337 | A1 * | 3/2005 | Nobusawa et al. | ............ 455/420 |
| 2006/0161639 | A1 * | 7/2006 | Kato | ............................... 709/219 |
| 2007/0130476 | A1 * | 6/2007 | Mohanty | ........................ 713/191 |
| 2010/0093335 | A1 * | 4/2010 | Marzorati | ..................... 455/420 |

* cited by examiner

Primary Examiner — Charles Appiah
Assistant Examiner — Jaime Holliday

(57) ABSTRACT

Providing for remote control of electronic devices at least in part utilizing a mobile radio access network (RAN) is disclosed herein. A control server is provided that can initiate an OTA message requesting control of a client device. The OTA message can be transmitted via the RAN to the client device, which can initiate a data network call upon receipt of the message. A data network address can be forwarded to the control server to facilitate data exchange between the server and client. The client can act upon and respond to commands issued by the server. As described herein, remote control of a client that does not maintain a persistent data network link can be conducted. Furthermore, key-mapping applications, DLL-based middle-ware, and other interface modules traditionally required to implement control of a remote device can be limited or avoided.

48 Claims, 11 Drawing Sheets

REMOTE CONTROL OF DEVICES UTILIZING A MOBILE NETWORK

TECHNICAL FIELD

The following relates generally to wireless communication, and more specifically to facilitating blind decoding of system information at a user terminal.

BACKGROUND

Wireless communication systems are widely deployed to provide remote devices with various types of communication content such as, e.g., voice content, data content, and so on. These wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, third generation partnership project (3GPP) long term evolution (LTE) systems, third generation partnership project 2 (3GPP2) ultra mobile broadband (UMB) systems, orthogonal frequency division multiple access (OFDMA) systems, and like systems.

Generally, a wireless multiple-access communication system can simultaneously support communication for multiple wireless terminals. Each terminal can communicate with one or more base stations via wireless transmissions on forward and reverse links. The forward link (or downlink) refers to the communication link from base stations to terminals, and the reverse link (or uplink) refers to the communication link from terminals to base stations. Further, communication between the terminals and base stations can be established via single-input single-output (SISO) systems, multiple-input single-output (MISO) systems, multiple-input multiple-output (MIMO) systems, and so forth.

Multiple wireless communication systems having different communication protocols exist simultaneously in modern wireless communications. Though many utilize radio frequency, microwave frequency or like electromagnetic spectra, the communication protocols for such systems can vary greatly. For instance, mobile telecommunication systems generally employ radio frames to segment a wireless signal and convey discrete groups of information, whether in analog or digital form, utilizing resources of the radio frames. Such resources can include, for instance, time-based slots or sub-slots of TDMA systems, frequency based resources of FDMA and OFDMA systems, code-based resources of CDMA systems, and/or symbol-based resources utilized in transmission of pilot information for various mobile network systems.

The mobile systems generally utilize carrier signals within government licensed frequency ranges, e.g., cellular frequency spectra. Transmission of wireless information employing licensed frequencies is termed over-the-air (OTA) transmission, and is distinct from wireless transmissions utilizing computer networking protocols, such as a wireless local area network (WLAN) employing transportation control protocol (TCP)/Internet Protocol (IP), for instance. The latter employs wireless signal resources to transmit data in packet form, whereas OTA transmission packages the data packet within an OTA message instead. The OTA message can be decoded by a suitable radio access network (RAN) receiver (e.g., at a mobile base station, Node B, etc.) enabling the data packet to be extracted from the message.

One great advantage of employing the licensed communication spectrum for wireless communications is that RAN infrastructure is already established in many parts of the world, and publicly accessible via most wireless terminal devices. Registration on such RANs and access to public networks such as the Internet, or private networks coupled to the Internet, is generally available on a subscription-basis with a wireless carrier. In contrast, wireless computer network access points (APs) are largely installed and maintained by private entities that might not offer public access or private/commercial subscription. Accordingly, user mobility in connection with mobile communications systems is much greater as compared with wireless computer networking systems, such as WLANs, wireless wide area networks (WWANs), and so on. However, substantially stationary equipment (e.g., desktop PCs, home/office security alarms, and other electronic processing or processor-controlled hardware) can maintain a direct communication link via a fixed computer network link (which can include, e.g., wired and/or wireless computer networking connections), since relatively little or no mobility is required. In the latter case, the stationary equipment often enjoys unlimited data access/usage for fixed cost.

With the expansion of the Internet, mobile networks and fixed computer networks have recently experienced significant intercommunication. Mobile communication networks, traditionally limited to circuit-switched core networks for remote communication, have integrated packet oriented data services providing Internet access either in conjunction with or in addition to the circuit-switched networks. As a result mobile terminals can obtain data services by initiating a data call (e.g., that activates a packet service) and exchange data with other devices coupled to the Internet. Thus, e-mail, voice calls, media data, and the like, can be exchanged between mobile terminals and computing devices each employing disparate network access technologies, via the Internet (or, e.g., a private wide area network intranet). Accordingly, a user can employ a cellular phone, for instance, to communicate directly with another person at a home computer. This interoperability of disparate communications networks has provided a paradigm shift for mobile communications in recent years.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for employing a mobile radio access network (RAN) for remote control of electronic devices. A control server is provided that can initiate an OTA message to be transmitted to a client device. Upon receipt of the OTA message, the client device can initiate a data call employing the mobile RAN, and obtain a network address (e.g., an Internet Protocol address) associated with the data call. The server and client can authenticate the respective remote device, optionally employing a secure data link, and initiate control of a native UI of the client by the server. The client can implement such control by forwarding the network address to the server device, which can utilize the address to pass native commands to the client. The client can then act upon or respond to the native commands as if the commands came from a direct interface to the client. As described, the subject disclosure can mitigate or eliminate key-mapping applications, dynamic link library (DLL)-based middleware, and other interface modules traditionally required to implement control of a remote device. Such a mechanism enables, for instance, remote troubleshooting by a technician, remote control of hardware, and so on, without maintaining a direct communication link with the Internet.

In some aspects of the subject disclosure, provided is a method for remote communication. The method can comprise initiating a message sent at least in part over-the-air (OTA), the message configured for accessing a remote device. The method can additionally comprise receiving a response to the message via a computer network link, the response comprising a network address of the remote device. Moreover, the method can comprise employing the network address to control a native user interface (UI) of the remote device over the computer network link.

According to additional aspects, disclosed is an apparatus for remote communication. The apparatus can comprise a communication processor that initiates a message sent at least in part OTA, the message configured for accessing a remote device. Further, the apparatus can comprise a computer network interface that receives a response to the message comprising a network address of the remote device. In addition the apparatus can comprise a server control module that employs the network address to control a native UI of the remote device over a computer network link coupled to the interface.

In one or more other aspects, provided is another apparatus for remote communication. Such apparatus can comprise means for initiating a message sent at least in part OTA, the message configured for accessing a remote device. Additionally, the apparatus can comprise means for receiving a response to the message via a computer network link, the response comprising a network address of the remote device. Further to the above, the apparatus can comprise means for employing the network address to control a native UI of the remote device over the computer network link.

In yet other aspects, disclosed is a processor configured for remote communication. The processor can comprise a first module that initiates a message sent at least in part OTA, the message configured for accessing a remote device. Moreover, the processor can comprise a second module that receives a response to the message via a computer network link, the response comprising a network address of the remote device. In addition to the foregoing, the processor can comprise a third module that employs the network address to control a native UI of the remote device over the computer network link.

According to at least one further aspect, provided is a device-readable medium comprising device-readable instructions configured for remote communication. The instructions can be executable by at least one device to initiate a message sent at least in part OTA, the message configured for accessing a remote device. The instructions can be further executable by the device(s) to receive a response to the message via a computer network link, the response comprising a network address of the remote device. Moreover, the instructions can be executable by the device(s) to employ the network address to control a native UI of the remote device over the computer network link.

In other aspects of the subject disclosure, provided is a method for remote communication. The method can comprise establishing a data session link via a mobile access network interface. The method can additionally comprise providing a data network address to a remote control server at least in part via the data session link and passing control of a native UI to a remote control server.

In addition to the foregoing, the disclosure provides for an apparatus for remote communication. The apparatus can comprise an OTA interface that establishes a data session link via a mobile access network interface. Further, the apparatus can comprise a client control module that provides a data network address to a remote control server at least in part via the data session link. Moreover, the apparatus can comprise a routing module that passes control of a native UI of the apparatus to a remote control server.

According to further aspects, disclosed is another apparatus for remote communication. The apparatus can comprise means for establishing a data session link via a mobile access network interface. Furthermore, the apparatus can comprise means for providing a data network address to a remote control server at least in part via the data session link. In addition, the apparatus can comprise means for passing control of a native UI to a remote control server.

According to some additional aspects, provided is a processor for remote communication. The processor can comprise a first module that establishes a data session link via a mobile access network interface. The processor can further comprise a second module that provides a data network address to a remote control server at least in part via the data session link. Moreover, the processor can comprise a third module that passes control of a native UI to a remote control server.

In at least one or more other aspects, disclosed is a device-readable medium comprising device-readable instructions configured for remote communication. The instructions can be executable by at least one device to establish a data session link via a mobile access network interface. Further, the instructions can be executable by the device(s) to provide a data network address to a remote control server at least in part via the data session link. In addition to the foregoing, the instructions can be executable by the device(s) to pass control of a native UI to a remote control server.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
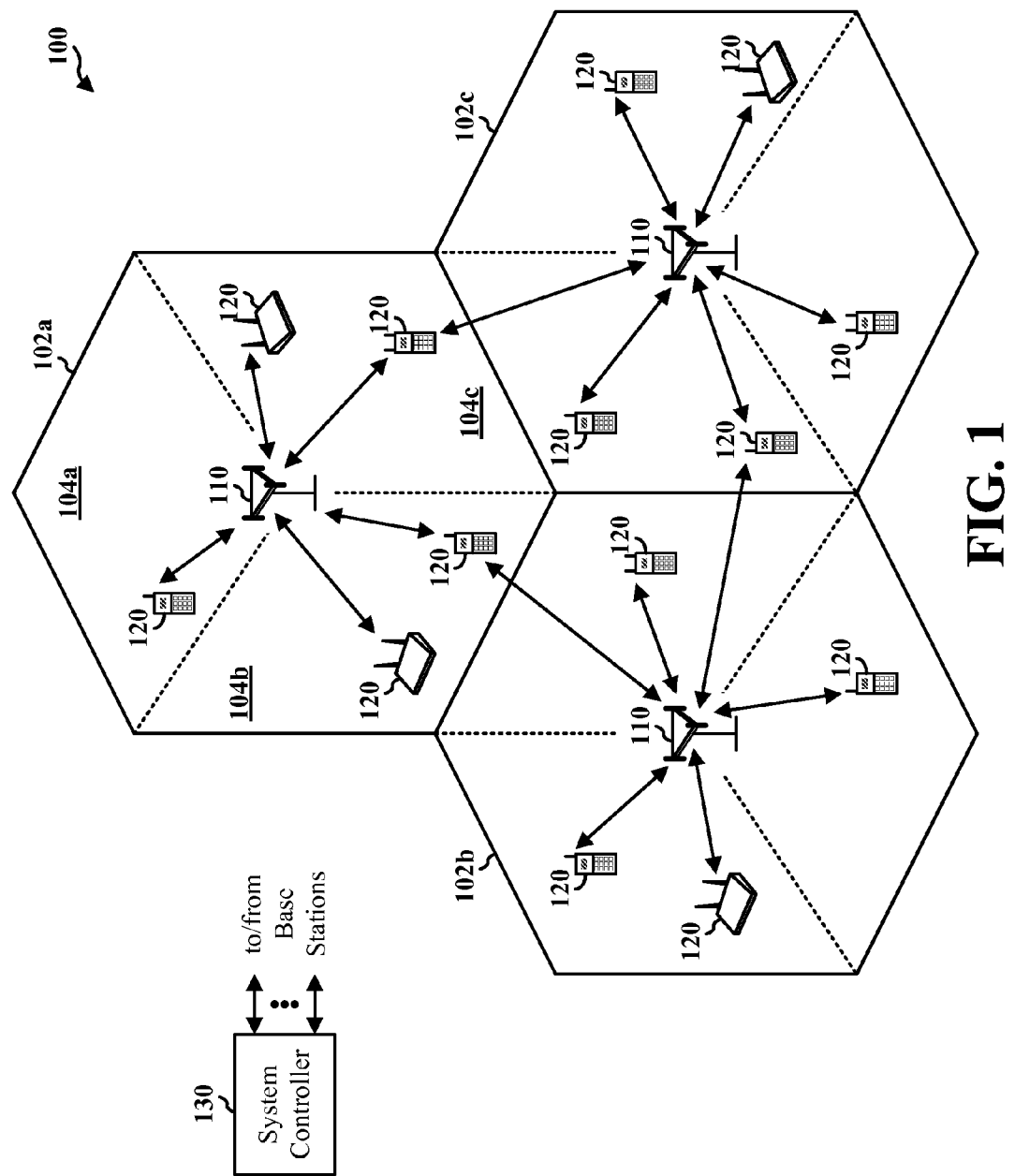
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of employing a RAN data link to control a native UI of a remote device. One skilled in the art should appreciate that similar techniques could apply to other communication environments.

Generally speaking, in order to troubleshoot or automate a user terminal (UT) within a mobile network environment (e.g., CDMA, GSM, wideband CDMA [WCDMA], etc.), software developers, testers, consumers, and so on, have to be physically close to a UT under test (UUT). In some cases, this can require travel, outsourcing work to local technicians and/or increased time to test and/or troubleshoot the UUT. To solve this problem, the subject disclosure provides for remote access and/or control of a UUT employing a mobile carrier's network as an interface between the UUT and a remote control device. Furthermore, the UUT need not have an active data link to enable the control. Furthermore, such remote control can facilitate direct interaction with a native UI of the UUT, utilizing commands from a remote server that are native to the UUT.

Control of the UUT can be initiated from a network server or from the UUT itself. For example, the network server can initiate a mobile network message requesting control of the UUT. The mobile network message can comprise any suitable OTA message, for instance. Specific examples can include a short message service (SMS) message, text message, instant message (IM), or the like, or a combination thereof. In some cases, specialized messages such as a wireless application part (WAP) 'push' message can be utilized to convey the control request to the UUT. Once the UUT receives the OTA message, a data call is initiated via a mobile network packet service (e.g., a circuit-switched network coupled to a general radio packet service [GPRS] network, or data-enabled core network such as a universal mobile telecommunications system [UMTS] network, ultra mobile broadband [UMB] network, or third generation partnership project (3GPP) long term evolution (LTE) network, or the like).

To facilitate communication with remote entities over a data network (e.g., the Internet), the mobile network packet service assigns a network address to the UUT for the data call session. This network address can comprise an Internet Protocol (IP) address when utilizing TCP/IP, or other suitable network address utilized by other fixed computer networks. As utilized herein, a data session call refers to a connection instance between an OTA terminal/client and a fixed data network that employs one network address for the call. Additionally, a data session call employs both a radio access network (RAN) (e.g., UMTS terrestrial radio network [UT-RAN], evolved UTRAN [E-UTRAN], etc.) and a data packet service as an interface between the OTA terminal/client and the fixed data network. However, it should be appreciated that in some aspects of the subject disclosure, the RAN and data packet service can be integrated into a single RAN/Core network, such as an all-data or all-IP mobile communication network (e.g., a worldwide interoperability for microwave access [WiMAX], or 802.16 network). In other aspects of the subject disclosure, the RAN and data packet service can exclude the single integrated RAN/Core network.

In addition to the foregoing, control of the UUT can be initiated from the UUT. As an example, a communication processor at the UUT can initiate the data call session, discussed above. Upon obtaining the network address for the data call session, a data message can be initiated and sent to the remote server via a communication link associated with the data call. A network address of the remote server can be obtained from a previous network-initiated control session, or can be entered into a user interface (UI) of the UUT, or stored in memory (e.g., secure storage), or the like, or a combination thereof. Once communication with the remote server is established, the UUT can pass the network address associated with the data call session to the remote server. Additionally, a client application can pass control of the native UI of the UUT to a server application on the remote server that is configured to directly control the native UI. Thus, UI mapping, DLL middleware, and the like can be avoided utilizing these aspects of the disclosure, as the remote server can be configured to directly control the native UI of the UUT via the network address of the data session call.

It should be appreciated that authentication and secure communication can be implemented in either the network-initiated or UUT-initiated control session. The secure communication can comprise a secure communication link, such as a virtual private network (VPN), a secure socket layer (SSL), session security or the like. Moreover, the secure communication can comprise encryption/decryption technology, such as public/private key pairs, data hashing, and so forth, to further mitigate unauthorized access to information associated with the control session (e.g., the network address of the data call session utilized to control the UUT, secure identity of the UUT and/or remote control server, etc.). Additionally, encryption/decryption can be utilized to authenticate an identity of remote devices (e.g., UUT, remote control server), as is known in the art or made known to one of skill in the art by way of the context provided herein.

Further to the above, it is to be appreciated that the UUT can be any suitable device configured at least for communication via a mobile RAN. Examples of suitable UUTs can comprise cellular telephones, mobile phones or smart phones, laptop computers, desktop computers, electronic processors and/or electronic-controlled devices coupled with a mobile RAN modem (e.g., a GOBI™ 3G wireless card by Qualcomm Inc.), or like devices or combinations thereof. Furthermore, it is to be appreciated that client and server applications that control a remote device or facilitate control of such device can be configured for various device operating systems. Examples of operating systems can include Brew®, JAVA™, WINDOWS® Mobile OS, MAC® OS, Linux® OS, WINDOWS® OS, Symbian® OS, Smartphone OS, Palm® OS, Android™ OS, RIM® OS, and so forth.

By implementing aspects of the subject disclosure, remote devices can be controlled despite lack of a persistent data connection at the remote device. Particular applications of the disclosed subject matter can enable, for instance, an original equipment manufacturer (OEM) (e.g., Dell, Hewlett Packard, Motorola, and so forth) to remotely develop, test or troubleshoot the remote device, software developers to remotely test/troubleshoot/develop software, operating systems, etc., at the remote device, wireless service carriers to remotely test/troubleshoot/develop operation of hardware and/or software in OTA transmission/reception, and so on. Thus, the proposed subject matter can decrease time to market for developing products/services, facilitate improved remote customer service and troubleshooting, remote control and/or automation of electronic devices (e.g., web cam, camcorder, television, radio, mobile phone, traffic-control device, electronic surveillance device, electronic-controlled metering device, and so on) coupled with a computing device (e.g., desktop PC, laptop, mobile device, smartphone, etc.). Accordingly, significant OEM, carrier, customer service and developer cost savings and/or efficiency increases can be provided by aspects of the subject disclosure, as well as enhanced functionality for device users.

The techniques described herein may be used for various wireless communication systems such as CDMA, TDMA, FDMA, OFDMA, SC-FDMA (single carrier FDMA) and other systems. The terms "system" and "network" are often used interchangeably. A CDMA system may implement a radio technology such as Universal Terrestrial Radio Access (UTRA), CMDA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). LTE is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal—UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media comprises computer-readable hardware, which includes computer storage media and hardware communication media that facilitates transfer of a computer program from one entity to another at least in part utilizing electrical, mechanical and/or electromechanical hardware, and communication media including any software, middleware, firmware, microcode and/or hardware medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if a program or software is transmitted from a website, server, or other remote source using a coaxial cable, fiber optic cable, twisted pair, digital subscriber line (DSL), communication bus structure, Ethernet, or wireless technologies such as infrared, radio, and microwave, then the coaxial cable, fiber optic cable, twisted pair, DSL, or wireless technologies such as infrared, radio, and microwave are included in the definition of medium, and any suitable hardware components associated with such medium are included in the definition of hardware communication media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium, device-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a wireless communication system 100 with multiple base stations 110 and multiple terminals 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102*a*, 102*b*, and 102*c*. The term "cell" can refer to a base station and/or its coverage area depending on the context in which the term is used. To improve system capacity, a base station geographic area/coverage area can be partitioned into multiple smaller areas (e.g., three smaller areas, according to cell 102*a* in FIG. 1), 104*a*, 104*b*, and 104*c*. Each smaller area (104*a*, 104*b*, 104*c*) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The blind decoding techniques described herein can be used for a system with sectorized cells as well as a system with multiple un-sectorized cells (e.g., a plurality of cells of a larger geographic area). For simplicity, in the following description, unless specified otherwise, the term "base station" is used generically for a fixed station that serves a sector as well as a fixed station that serves a cell. In addition, the term "cell" is used generically to refer to a geographic cell comprising multiple sectors, or a geographic area comprising multiple cells.

Terminals 120 are typically dispersed throughout the system, and each terminal 120 can be fixed or mobile. Terminals 120 can also be called a mobile station, user equipment, a user device, or some other terminology, as discussed above. A terminal 120 can be a wireless device, a cellular phone, a personal digital assistant (PDA), a wireless modem card, and so on. Each terminal 120 can communicate with zero, one, or multiple base stations 110 on the downlink and uplink at any given moment. The downlink (or forward link) refers to the communication link from the base stations to the terminals, and the uplink (or reverse link) refers to the communication link from the terminals to the base stations. As used herein, a base station with which a terminal 120 maintains an active communication or an active registration is termed a "serving base station".

For a centralized architecture, a system controller 130 couples to base stations 110 and provides coordination and control for base stations 110. For a distributed architecture, base stations 110 can communicate with one another as needed (e.g., employing a backhaul network, not depicted). Data transmission on the forward link often occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
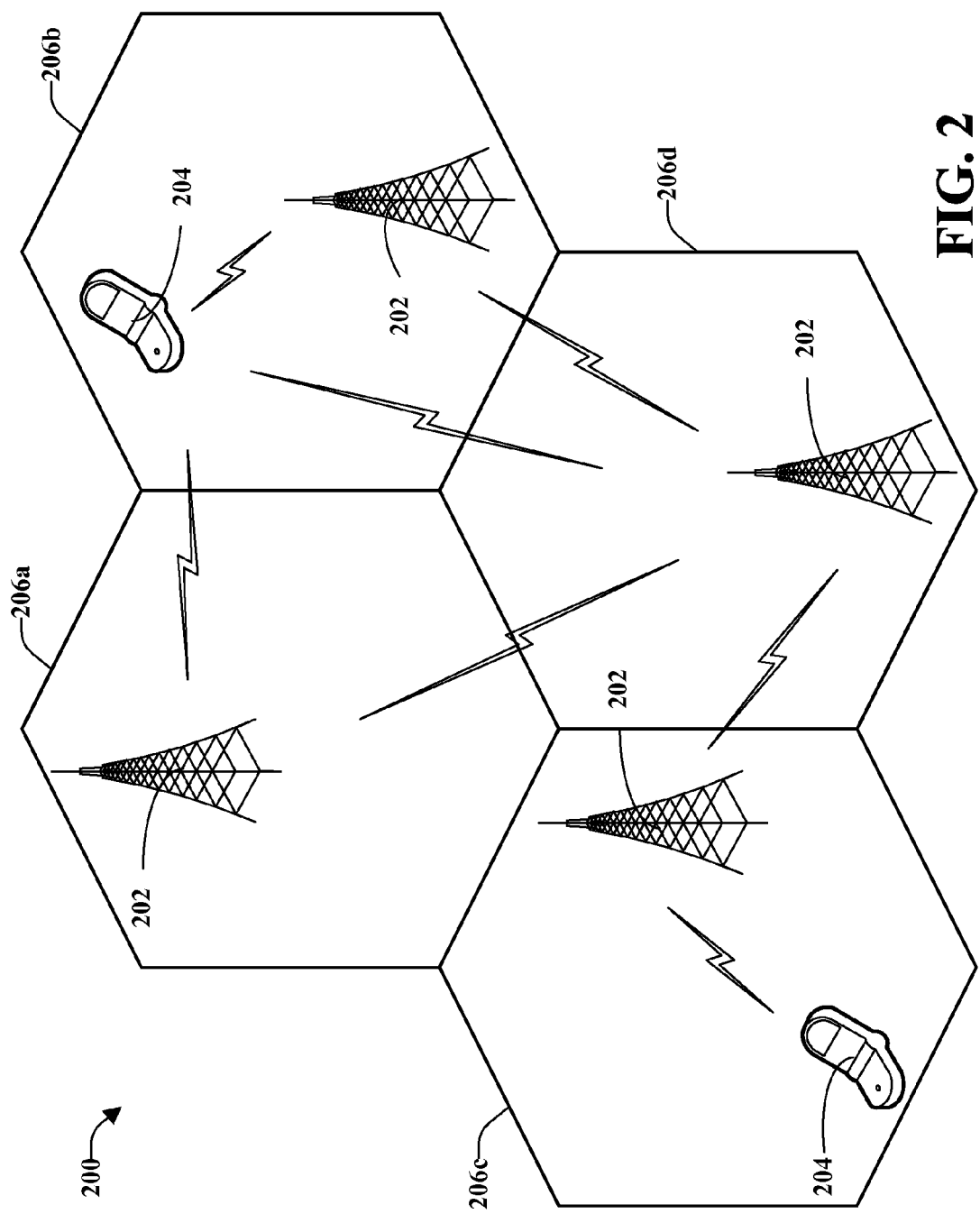
FIG. 2 depicts a block diagram of an example communication apparatus for employment with a wireless communication environment.

FIG. 2 is an illustration of an ad hoc or unplanned/semi-planned wireless communication environment 200, in accordance with various aspects. System 200 can comprise one or more base stations 202 in one or more cells and/or sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device configured for wireless data exchange with a remote device. It should be appreciated that mobile devices 204 can also receive, transmit, repeat, etc., wireless communication signals to each other and/or to the one or more base stations 202 of system 200. System 200 can be employed in conjunction with various aspects described herein in order to facilitate control of a native UI of a remote device utilizing, at least in part, a RAN as an interface to the remote device, as set forth herein.

Figure 3:
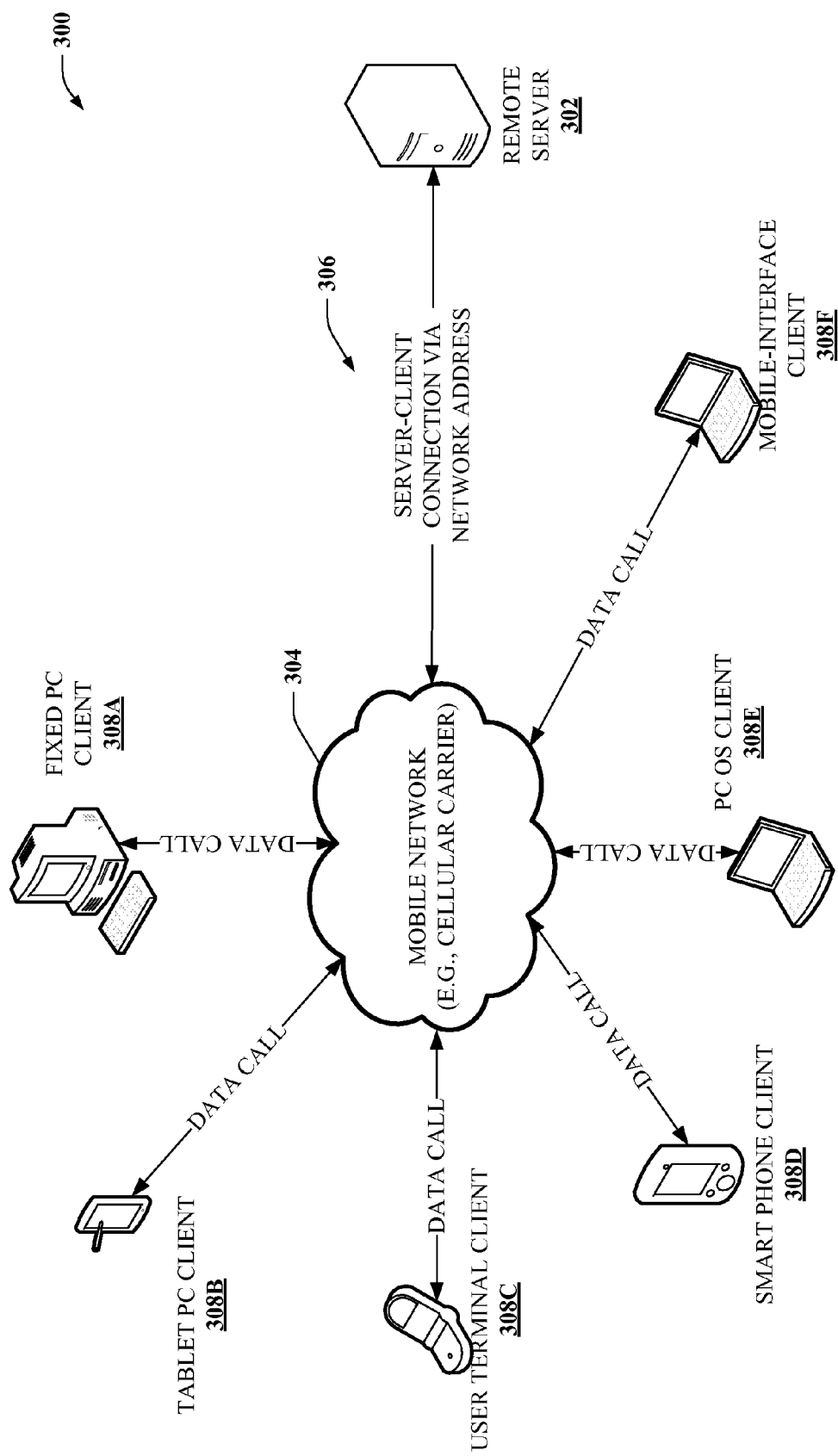
FIG. 3 illustrates a block diagram of an example system providing remote control of electronic devices employing a mobile network interface.

FIG. 3 illustrates a block diagram of an example system 300 that facilitates remote control of client devices (308A, 308B, 308C, 308D, 308E, 308F). Commands issued by a controlling device (302) can be native to a UI and/or operating system (OS) of the client device (308A, 308B, 308C, 308D, 308E, 308F), and actions or responses taken by the controlled client device as a result of the commands can be native to such UI and/or OS. Thus, in effect, system 300 provides the controlling device (302) access to the native UI of the client device (308A, 308B, 308C, 308D, 308E, 308F). Accordingly, middleware software such as DLL code, key-mapping software, and the like used to facilitate remote control of an electronic device can be obviated by system 300. As a result, system 300 provides a robust, efficient and flexible mechanism for control of one or more devices (308A, 308B, 308C, 308D, 308E, 308F) by a remote device (302).

System 300 comprises a remote server 302. Remote server 302 can further include a remote control server application (not depicted) configured to control a native UI of one or more OTA capable remote clients (308A, 308B, 308C, 308D, 308E, 308F). Specifically, the remote control server application can comprise one or more client profiles that include or point to interface commands, communication protocols, and the like, suitable to communicate with an OS, a remote client application and/or other applications of each of the one or more clients.

The OTA capable remote clients can include a fixed PC client 308A, a tablet PC client 308B, a user terminal (UT) client 308C, a smart phone client 308D, a PC OS client 308E and/or a mobile-interface client 308F. The client devices (308A, 308B, 308C, 308D, 308E, 308F) comprise a client application that can pass control of the native UI of the client to a remote server application configured to communicate with the client, discussed above. Additionally, the clients 308A, 308B, 308C, 308D, 308E, 308F can have a mechanism to initiate a data session link with a mobile communication network 304. As an example of such mechanism, a client (e.g., Fixed PC client 308A) can comprise a wireless transceiver and antenna (not depicted, but see FIG. 7, infra) configured to communicate with a RAN that provides wireless access to the mobile network 304. Additionally, the client 308A can include user profile information (e.g., maintained on a subscriber identity module [SIM] card) associated with a data subscription with a wireless carrier that manages the mobile network 304. The data subscription can enable the client 308A to utilize a packet service network (e.g., GPRS, UMTS, UMB, LTE, WiMAX, etc.) associated with the mobile network 304. The packet service network can be further coupled with a computer network (e.g., the Internet, a TCP/IP based intranet, and so on), and provide the client with a network address (e.g., IP address) suitable to establish a computer network link 306 with another device (302) coupled to the computer network. Thus, the client device 308A can form a communication link 306 with the remote server 302 via the mobile network 304.

Once the computer network link 306 between a client (308A, 308B, 308C, 308D, 308E, 308F) and the remote server is established 302, device authentication can be initiated to verify whether the remote server 302 is authorized to control the client (308A, 308B, 308C, 308D, 308E, 308F), and whether the client is authorized for such control. If authentication is successful, the client (308A, 308B, 308C, 308D, 308E, 308F) can submit the network address acquired upon establishing the data call, above, to the remote server 302. Utilizing the network address, the remote server 302 can take control of the client (308A, 308B, 308C, 308D, 308E, 308F) by issuing commands to the client via the computer network link 306. The client (308A, 308B, 308C, 308D, 308E, 308F) can act upon the commands and send data in response also via the link 306.

In some aspects of the subject disclosure, the client (308A, 308B, 308C, 308D, 308E, 308F) can pass control of a native UI of the client to the remote server 302. In such case, the remote server 302 can communicate with the client utilizing commands that are native to the UI. Additionally, the client (308A, 308B, 308C, 308D, 308E, 308F) can respond with data over the computer network link 306 in a manner analogous to a local bus of the client. Thus, the remote server 302 can act as a remote input/output device (e.g., keyboard, mouse or microphone input, video, text or audio output, etc.) for the client (308A, 308B, 308C, 308D, 308E, 308F). This can provide a significant advantage in remote testing, troubleshooting or developing a client device, in that travel to the remote location of the client can often be obviated. Additionally, the client can be tested under conditions that exist in the remote environment (e.g., a mobile network servicing one part of the world) utilizing a remote server stationed in a laboratory (e.g., in another part of the world). Significant cost savings in testing/troubleshooting of client devices and time to market of such devices can be achieved by system 300.

Figure 4:
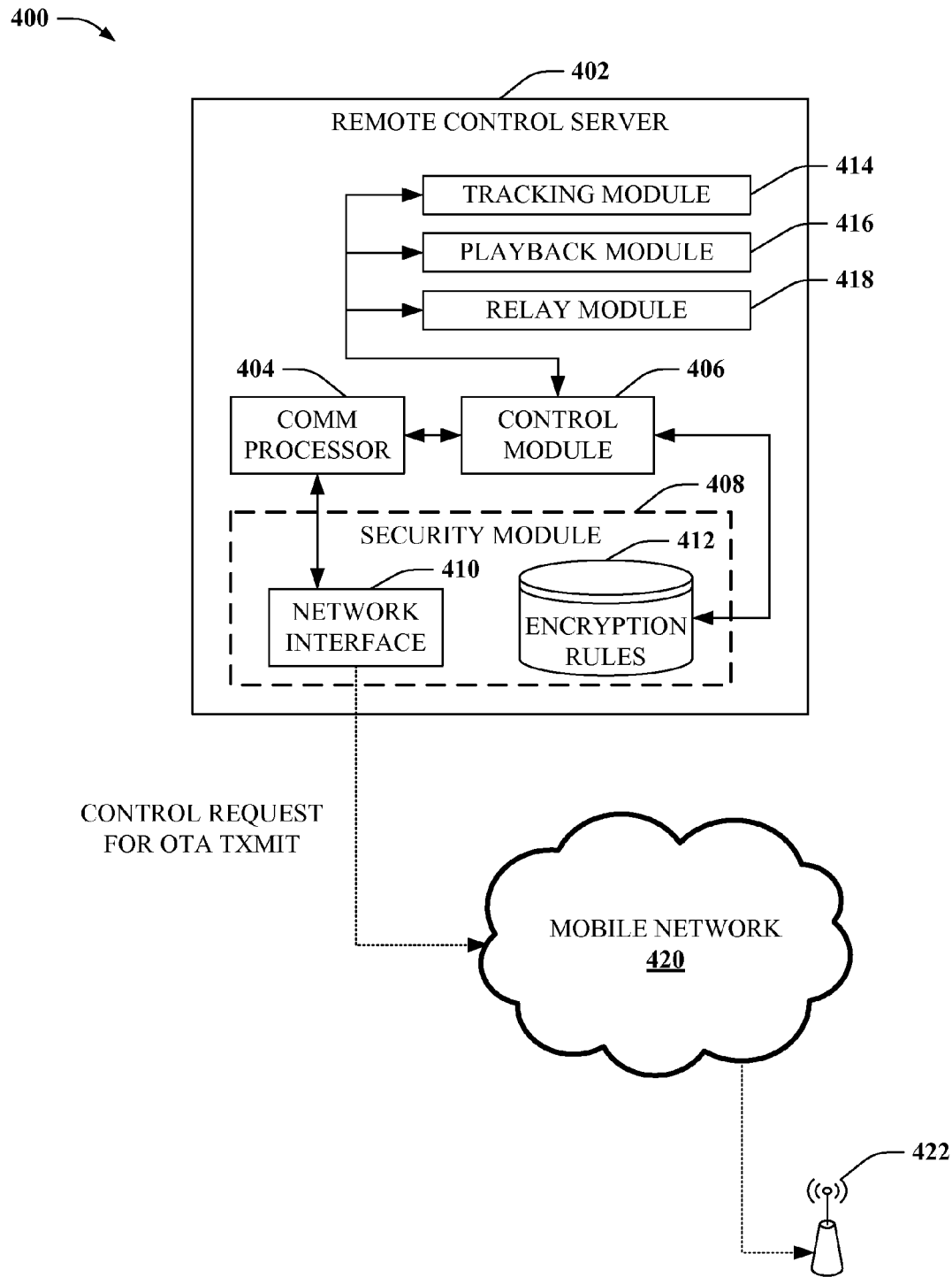
FIG. 4 depicts a block diagram of an example remote control server that can control a native UI of a remote device according to aspects of the subject disclosure.

FIG. 4 illustrates a block diagram of an example system 400 comprising a remote control server 402 according to aspects of the subject disclosure. Server 402 is configured to communicate with a mobile network 420 and can, in some instances, be a component of the mobile network 420. In other instances, remote control server 402 can be a device external to the mobile network 420, such as a user terminal, desktop PC, laptop, network server, mobile equipment, or other mobile communication device configured for communication and/or access with the mobile network 420.

Server 402 can comprise a communication processor 404 that initiates a message configured to access a remote client device (not depicted). The message can contain a request for control of the client device via a client application on such device. Particularly, the message can request a network address suitable to form a data link (e.g., a TCP/IP computer network link) with the client device and provide commands to and receive data responses from such client device. In some aspects, the message can be configured for transmission over-the-air (OTA) to the client device. Thus, in such aspects, the message can be sent by a wireless base station 422 coupled with the client device. It should be appreciated that the OTA message, as generated by communication processor 404, need not initially be in OTA format. The OTA message can be a data packet that can be packaged into an OTA message by mobile network 420 for transmission by base station 422. Thus, remote server 402 can forward such a data packet request via a data network (e.g., TCP/IP network) to mobile network 420, which can package the request in OTA format for transmission by the base station 422. In other aspects of the disclosure (e.g., where remote control server is a component of mobile network 420 or is a simulator that simulates such components), the message initiated by communication processor 404 can be in OTA format, and can simply be relayed by mobile network 420 to base station 422 for transmission.

In general, by employing an OTA message to initiate the request to the remote device, the client need not maintain an active data network link to receive the remote control request message initiated by communication processor 404. In addition, the client need not be in an active communication mode with mobile network 420. Rather, mobile network 420 can page the client as is known in the art of mobile communications, and then forward the message request. The client can then initiate the data link upon receiving the message OTA from base station 422.

In some aspects, remote control server 402 can comprise a security module 408 configured to mitigate or avoid unauthorized access to remote communication. The security module 408 can comprise a secure interface (410) configured to access a secure data link, such as a virtual private network (VPN) or a secure socket layer link (SSL), or the like. Additionally, in some aspects of the subject disclosure, the security module can limit access to the secure interface (410) to protect communication from non-secure or un-authorized components of the remote control server 402. Thus, in such aspects, the security module 408 can authenticate another module of remote control server 402 (or, e.g., of an external device) before permitting data exchange between the secure interface (410) and such other module.

According to yet other aspects, security module 408 can encrypt data exchanged with a remote device (e.g., remote control commands, a network address of the remote control server 402) and decrypt data received from the remote device. In such aspects, secure storage 412 can contain rules for encrypting/decrypting data. As one example, the encryption/decryption rules can comprise public keys for remote server 402 and other remote devices and/or device modules, a private key for remote control server 402, and instructions for utilizing public/private key pairs for encryption/decryption. Other mechanisms for encrypting/decrypting data can also be employed by secure storage 412, as is known in the art or made known to one of skill in the art by way of the context provided herein.

Server 402 can also comprise a network interface 410 (optionally a secure interface, as discussed above) configured to communicate with one or more networks (420) and exchange data with remote devices via such networks. For instance, network interface 410 can comprise an OTA interface that can communicate with mobile network 420 via an OTA RAN. According to another aspect, network interface 410 can comprise a computer network interface that can communicate with mobile network 420 via a data network or packet-based network. Such data/packet network can comprise any suitable wired (e.g., Ethernet, coaxial cable, digital subscriber line [DSL], twisted conductor pair line, etc.) or wireless (e.g., 802.11x wireless, 802.16x WiMAX, Bluetooth®, near-field radio frequency [RF], and so on) data exchange interface, whether a direct ad-hoc connection between devices or an indirect connection comprising one or more hubs, routers, switches, or the like. In at least one such aspect, the data/packet network can include the Internet or a private intranet. Network interface 410 can transmit the remote control request message initiated by communication processor 404, and further can receive a response to such message. The response can be forwarded to control module 406 for processing. In some aspects, the response can comprise a network address of the remote device, which can be utilized to facilitate remote control of such device by the server 402.

Server control module 406 can be configured to extract a network address from a response to the control request initiated by communication processor 404. The network address can enable server control module 406 to interface with a client module of a remote device providing the network address. Specifically, such address can provide access to and control of a native UI of the remote device. Thus, by employing the network address to communicatively couple with the client module, server control module 406 can exchange native UI commands with the client module, and receive data and other responses to such commands. Such data and responses can include audio, video, text and/or like output data suitable for a native output interface of the remote device. Thus, remote control server, in at least some aspects of the subject disclosure, can provide an interface to the remote device similar to that provided by local UI modules of such remote device (e.g., keyboard, mouse, monitor, speakers, etc.).

According to some aspects of the disclosure, control module 406 can access various peripheral modules (414, 416, 418) in conjunction with control of a remote device, or facilitating control of such device. In some such aspects, control module 406 can employ a tracking module 414 to record command data sent to a controlled remote device and response data received from the controlled remote device. The recording can comprise a logging function that logs such commands/responses, a macro function that records the commands/responses and generates a command script to reproduce a control session, a media recording function that saves UI representations of issued commands, data received, etc., or combinations thereof (Examples can include a video file recording that stores graphical display of mouse movements, text input, application interface selections, and so on, as well as output data received from the remote device such as a display feed of a monitor of the remote device, an audio/video feed of a device, such as a web cam or camcorder, coupled to the remote device, and so forth). Additionally, a playback module 416 can facilitate replay of recorded commands/data responses. The playback module 416 can display a recorded log, play a macro display file showing UI commands and responses to such commands, play a media stream of media data returned in response to the UI commands, etc. In some aspects, the playback module 416 can output the recording as a text and/or media file suitable for play on other devices.

In at least one other aspect, control module 406 can employ a relay module 418 to pass control of a remote device to a second device (not depicted). For instance, the control module 406 can couple to a server control module (406) located on the second device via network interface 410 and relay module 418 can route commands issued by the second device to the remotely controlled device, and forward data responses from the remotely controlled device to the second device. Accordingly, the second device can utilize remote control server 402 as a gateway to control the remote device. In other such aspects, security module 408 can authenticate the second device and condition passing control to such device on a result of the authentication. Accordingly, remote control server 402 can verify whether the second device is authorized for remote control of the remotely controlled device.

Figure 5:
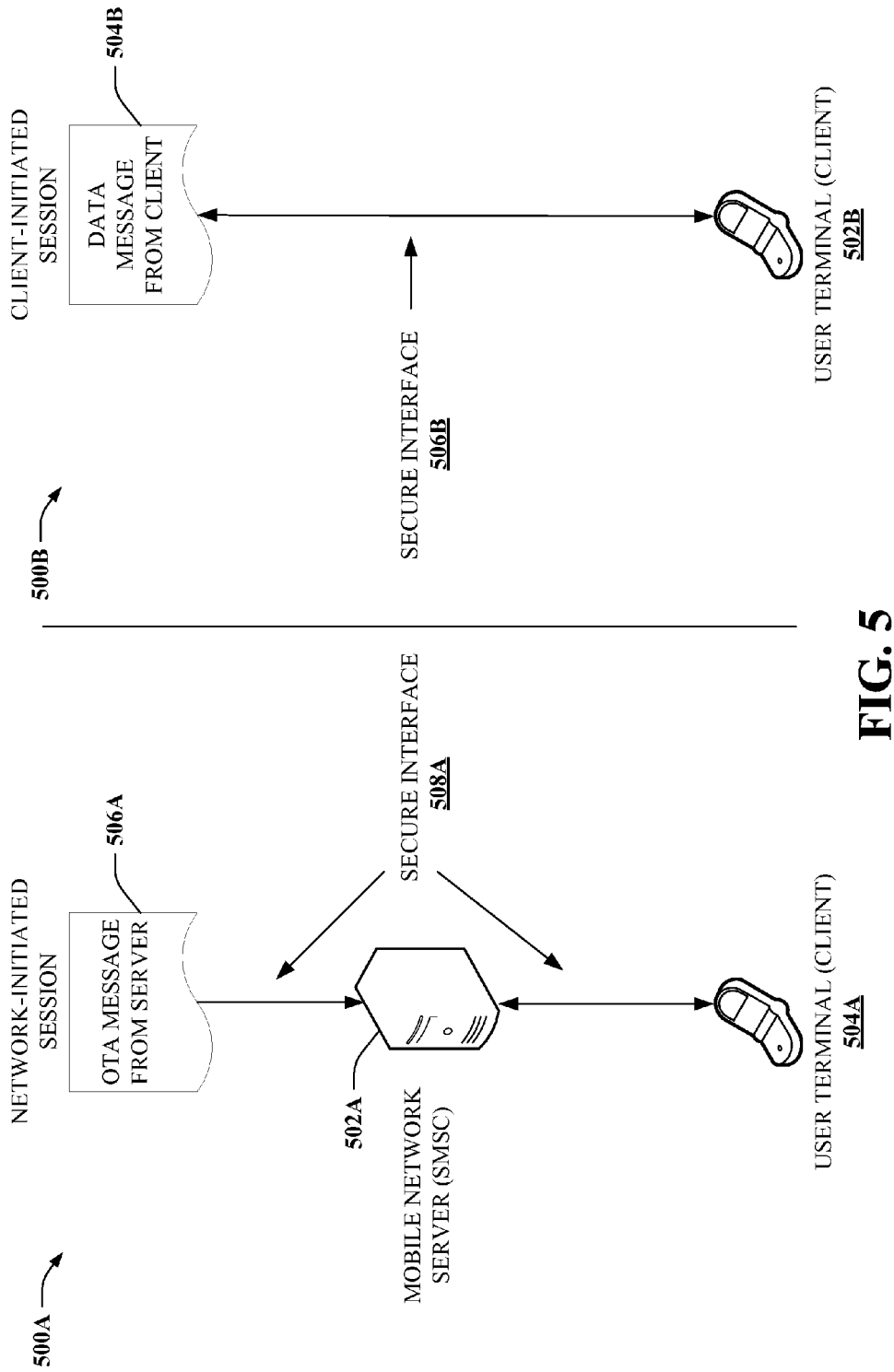
FIG. 5 illustrates a block diagram of sample network-initiated and client-initiated remote control sessions.

FIG. 5 illustrates two block diagrams 500A, 500B of examples in which a control session as described herein can be initiated. In diagram 500A, the control session is initiated by a remote server (not depicted, but see FIG. 4, supra) attempting to control a client device 504A. The remote server can initiate an OTA message 506A requesting access to a client 504A. The message 506A can be forwarded by the remote server to a mobile network server (e.g., a mobile switching center [MSC] serving the client), which can schedule the message for OTA transmission to the client 504A. Upon receiving the message, client 504A can initiate a data call (optionally via a secure connection 508A) and obtain a network address. The client can authenticate the remote server, and forward the network address to the remote server if authentication indicates the server is authorized to control the client. Data exchange can then be conducted between the server and client, as described herein. Accordingly, where a technician, software developer, etc. desires to test the client from a remote location, a remote control session can be initiated at the remote server from such remote location.

As depicted at system 500B, the client can also initiate a control session (e.g., based on a user interface command or execution of a remote control application stored on the client). Thus, the client first initiates a data call (optionally employing a secure interface 506B) and obtains a network address. If the client is already engaged in a data call, and has an existing computer network link, the network address associated with the existing network link can be utilized instead. The client can initiate communication with a remote server by sending a data message 504B to the remote server. In some aspects, the client 502B can utilize a network address of the server provided in an OTA message (506A) by a previous server-initiated control session to initiate communication. In other aspects, the network address of the server can be entered at a user interface of the client 502B, or by coupling to a data store comprising the remote server's network address, or the like. The remote server can employ the communication to authenticate the client (e.g., by extracting a digital signature of the client) and determine whether such client is authorized for a remote control session. If the client is authorized, the remote server can respond to the client 502B, providing authentication information (e.g., a digital signature of the server) to the client. The client 502B can then authenticate the server, and if the server is authorized to control the client 502B, pass the network address to the server to facilitate the control session. Thus, for instance, where a user of client 502B desires technical support or troubleshooting, the user can initiate the control session to facilitate such support.

Figure 6:
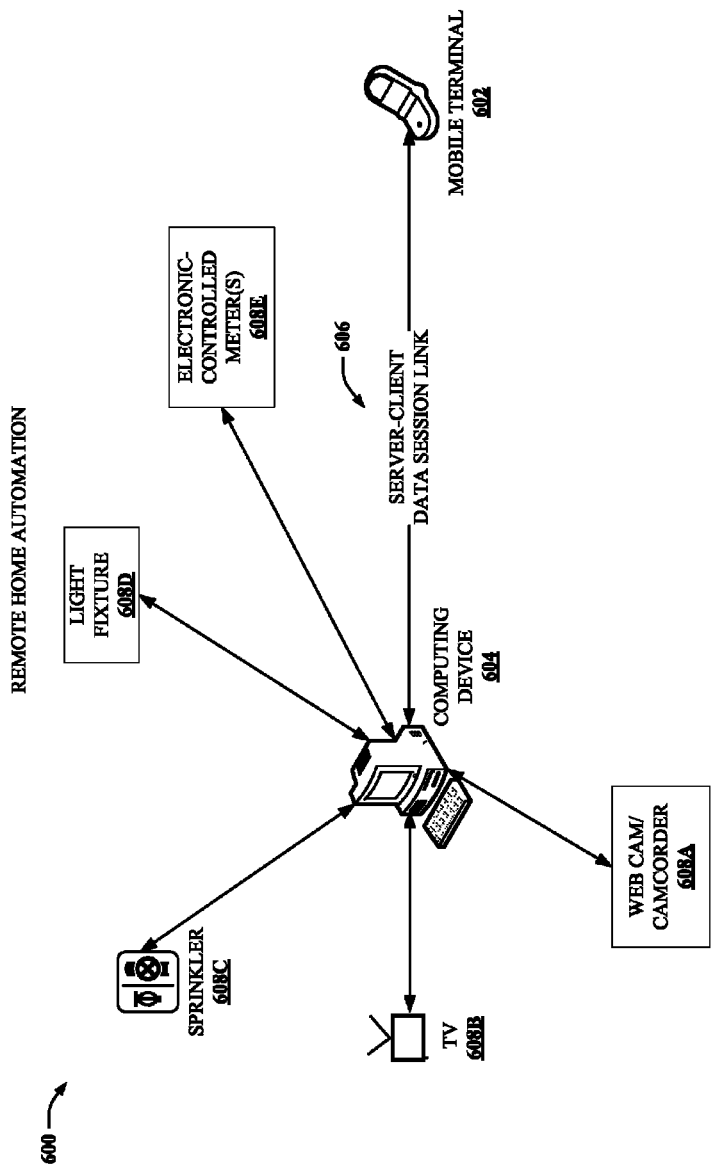
FIG. 6 depicts a block diagram of an example system providing remote automation employing a user terminal according to one or more disclosed aspects.

FIG. 6 depicts a block diagram of an example system 600 providing remote automation according to aspects of the subject disclosure. System 600 comprises a mobile terminal 602 configured as a remote control server (e.g., as depicted at FIG. 4, supra) coupled with a computing device 604 via a server-client data session link 606. The computing device can be any suitable client device (e.g., as depicted at FIG. 3, supra), including a desktop PC, a laptop, tablet PC, a mobile terminal, etc. Additionally, the server-client data session link 606 can be a suitable computer network link at least in part employing a data packet service of a mobile communication network. Thus, either mobile terminal 602 or computing device 604, or both, can be coupled with the mobile communication network via a RAN. Alternatively, either mobile terminal 602 or computing device 604 can be coupled with the mobile communication network via a data link such as the Internet.

Computing device 604 is further coupled with one or more other electronic or electronically-controlled devices 608A, 608B, 608C, 608D, 608E. Such devices can include a webcam or camcorder 608 (which, e.g., can also comprise a cellular telephone having a camera and/or video camera), a television 608B, a sprinkler system 608C, one or more lighting fixtures 608D and electronic-controlled metering devices 608E (e.g., home/business/vehicle gas meter, electric meter, water meter oil meter, etc.). The computing device 604 can communicate with such devices 608A, 608B, 608C, 608D, 608E via any suitable wired (e.g., USB, Ethernet, 1394 link) and/or wireless (e.g., Bluetooth, near-field infrared communication [NFIC], WLAN) interface, as is known in the art or made known to one of skill in the art by way of the context provided herein. Additionally, the electronic and/or electronic-controlled devices can include software, middleware and/or hardware applications that facilitate control of the devices (608A, 608B, 608C, 608D, 608E) by computing device 604. Thus, computing device can pass parameter values to the devices to configure suitable operationally configurable parameters (e.g., power on/power off, position/orientation/brightness/contrast/color, etc. of a webcam/camcorder, channel/volume etc. of a television, orientation/water flow/water pressure/duration etc. of a sprinkler system, brightness of a lighting fixture, on/off state of various electronic-controlled meters, and so on).

By way of the server-client data session link 606, mobile terminal 602 can also control devices (608A, 608B, 608C, 608D, 608E) coupled with the computing device 604 in a manner similar to the computing device 604. Thus, the mobile terminal 602 can provide the parameter values that control operationally configurable parameters of such devices (608A, 608B, 608C, 608D, 608E). Thus, for instance, from a remote location mobile terminal 602 can turn on webcam/camcorder 608A, select a view angle, select an optical and/or digital zoom parameter, focus the webcam/camcorder 608A, take a picture, record video, and so on. As another example, the mobile terminal can turn on/off television 608B, select a channel, a volume, and so on. Additionally, where television 608B is capable of providing an audio/video stream to computing device 604, such stream can be viewed at mobile terminal 602 via the data session link 606. As yet another example, mobile terminal 602 can turn on/off sprinkler 608C, control water flow, direction and orientation (e.g., where such direction/orientation could optionally be captured by webcam/camcorder 608A and relayed to a display of mobile device 602), and the like. In still other examples, mobile terminal 602 can turn on/off or set lighting levels of one or more lighting fixtures 608D (optionally viewed via webcam/camcorder 608A), view and/or control home/office/vehicle gas, water, oil, electricity meters/gauges, and the like. Accordingly, system 600 provides for remote automation of various types of electronic or electronically-controlled devices of a home, office, apartment, vehicle, or the like, via a mobile terminal (or other suitably remote control server device, described herein).

In at least one particular example, computing device 604 can comprise a cellular telephone, smart-phone, dual-mode phone, or the like. Additionally, a client application (not depicted, but see FIG. 7, infra) on such cellular telephone 604 can enable passing control of a native UI of the phone 604. Accordingly, from a remote mobile terminal 602, applications, functions, modules, etc. of the cellular telephone 604 can be accessed by mobile terminal 602. Moreover, such applications/functions/modules etc. can be accessed in conjunction with native input/output associated with the cellular telephone 604. Thus, for instance, a camera or video-recorder of cellular telephone 604 can be activated and viewed on a display of the mobile terminal 602, in substantially identical manner as would be viewed on a display of cellular telephone 604. It should be appreciated that other applications/functions/modules of the device 604 can also be accessed in a native manner. Accordingly, remote use, testing, troubleshooting, etc., of cellular telephone 604 can be conducted remotely in a substantially identical manner as use/testing/troubleshooting the device 604 via physical input/output components (e.g., keypad, display screen, audio/video control buttons, microphone jacks, USB ports, etc.) of the device 604.

Figure 7:
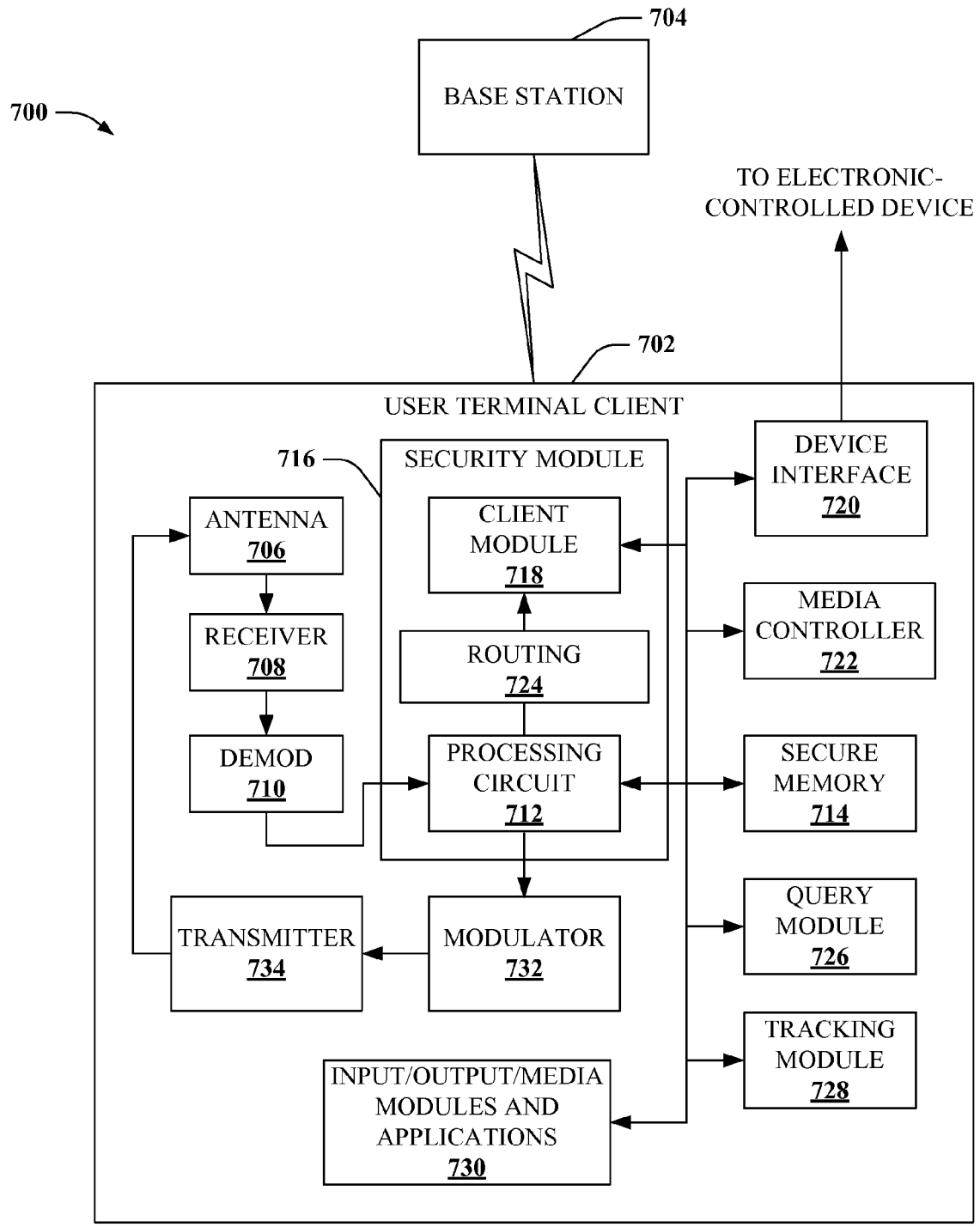
FIG. 7 depicts a block diagram of an example system comprising a user terminal configured for remote control by a client device.

FIG. 7 depicts a block diagram 700 of a sample user terminal (UT) 702 client device configured to facilitate control of the UT 702 by an external device. In particular, UT 702 can initiate a data call, optionally in response to receiving a control request OTA from a base station 704, and provide a network address associated with the data call to an authorized remote control server. Commands received via the data call can be served by a client application as if input at the UT 702.

In general, UT 702 can be configured to wirelessly couple with one or more remote transceivers 704 (e.g., access point, base station, peer node). UT 702 can receive wireless signals from such transceiver(s) 704 on a FL channel and respond with wireless signals on a RL channel, as known in the art. UT 702 includes at least one antenna 706 (e.g., a transmission receiver or group of such receivers comprising an input interface) that receives a signal (e.g., wireless message) and receiver(s) 708, which performs typical actions (e.g., filters, amplifies, down-converts, etc.) on the received signal. In general, antenna 706 and transmitter 728 (collectively referred to as a transceiver) can be configured to facilitate wireless data exchange with remote transceiver 704.

Antenna 706 and receiver(s) 708 can also be coupled with a demodulator 710 that can demodulate received symbols and provide them to a processing circuit 712 for evaluation. Processing circuit 712 can employ a modulator 732 to modulate data into symbols suitable for wireless transmission via transmitter 734 and/or antenna 706. It should be appreciated that processing circuit 712 can control and/or reference one or more components (706, 708, 710, 714, 716, 718, 720, 722, 724, 726, 728, 730, 732, 734) of the UT 702. Further, processing circuit 712 can execute one or more modules, applications, engines, or the like (716, 718, 720, 722, 724, 726, 728, 730) that comprise information or controls pertinent to executing functions of the mobile terminal 702. For instance, such functions can include executing multi-media features (730) of the UT 702 (e.g., digital camera, video-recorder, audio/video player, ring-tone player, games, calculator, and so on), initiating a voice call, initiating a data call, facilitating remote control of the UT 702, authenticating a remote server, restricting unauthorized devices/modules from accessing the UT 702, and so on, as described herein.

Mobile terminal 702 can additionally include memory 716 that is operatively coupled to processing circuit 714. Memory 716 can store data to be transmitted, received, and the like, and instructions suitable to conduct wireless communication with remote transceiver(s) 704. Further, memory 716 can store the modules, applications, references, engines, etc. (714, 718, 720, 722) executed by processing circuit 714, above. In some aspects, memory 716 can comprise secure memory (716) configured to reduce or eliminate tampering of data stored thereon.

UT 702 further comprises a security module 716 for securing access to processing circuit 712 and client module 718. Security module 716 can, for instance, require other components of UT 702 to establish authenticity prior to exchanging data with processing circuit 712 and client module 718. In such a manner, security module 716 can prevent unauthorized control of UT 702 by malicious code that gains access to client module 718. Additionally, security module 716 can employ a secure interface 720 to a VPN, SSL connection, session security, or the like, for tamper-resistant data exchange with remote devices. The secure interface can be employed with a wireless link to base station 704, or via a data link with electronically-controlled devices (e.g., see FIG. 6, supra), or both. In addition to the foregoing, security module 716 can authenticate a remote control device (704) or other devices coupled to UT 702. Rules for conducting authentication can be stored in secure or tamper-resistant memory 714. The rules can include public/private key algorithms, data hashing codes, and/or other mechanisms for authenticating devices on a network and/or encrypting/decrypting data.

To facilitate remote control of UT 702 by a remote device, processing circuit 712 can employ demodulator 732, transmitter 734 and antenna 706 (where transmitter 734, receiver 708 and antenna 706 collectively provide an OTA interface) to establish a data session link via base station 704. The data session can be initiated by client module 718 (e.g., in response to a UI input), or in response to a remote control request received at antenna 706. Client control module 718 can obtain a network address (e.g., IP address) associated with the data call. If communication has not been established with a remote control server, client control module 718 can send a message to the server utilizing the data session link. To facilitate sending the message, an address of the server can be obtained from a received control request, stored in memory, or input to UT 702. If security module 718 successfully authenticates the remote server, client module 718 can forward the network address of the data call to the remote server. Optionally, forwarding the network address can be conditioned on obtaining a response to a query (e.g., from a UI input) initiated by a query module 726. The response to the query can be in lieu of or in addition to authentication by security module 718. Once the network address is forwarded to the remote server, a routing module 724 can process control server commands obtained OTA and forward the commands to client module 718. Client module 718 and/or processing circuit 712 can act upon and/or respond to such commands as if they were given at a component of UT 702.

Additionally, data from various input/output/media modules and applications 730 of UT 702 can be forwarded by client module 718 via the data session link in response to commands from the remote server. Thus, a video feed of a video recorder of UT 702 can be streamed to the remote server, output data of an audio/video player can be streamed to the remote server, output data from other applications 730 (e.g., calculator, web browser, game application, Bluetooth interface, operating system of UT 702, and so forth) can also be forwarded to the remote server via client module 718. Thus, as described above, client module can facilitate remote control of a native UI of UT 702.

In addition to the foregoing, UT 702 can be coupled with one or more external hardware devices via device interface 720. The hardware device(s) can comprise any suitable electronic and/or electronically-controlled device. Examples can include a web cam, video camera, another UT, a traffic light, a surveillance camera, a night vision camera, a lighting fixture, a sprinkler system, a television set, a radio, or an appliance meter such as a water meter, gas meter, electric meter, etc., or a like device or a combination thereof. In particular, the device interface 720 can facilitate operational data exchange with such devices suitable to control output, parameters, responses, etc. of such devices, as described herein and/or known in the art. Additionally, a media controller 722 can exchange media information (e.g., audio, video, photographic) between the electronic devices and a remote control server via a data session link maintained by UT 702. Thus, for instance, a video feed provided by a webcam coupled to UT 702 can be forwarded to the remote control server via media controller 722.

According to at least one aspect of the disclosure, a tracking module 728 can be employed to record a control session. Commands received, actions taken, and responses provided can be written by the tracking module 728 to a log file, a macro script, or the like. Additionally, media data from an application of UT 702 or of an electronic device coupled thereto via device interface 720 can be recorded and written to a media file, and linked with the log/macro script. Thus, by replaying the control session, pictures, audio/video feed, or display activity associated commands/activities/responses provided by UT 702 can be reviewed as well. Thus, tracking module 728 provides a mechanism to review, re-examine and or re-implement a remote control session.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include remote control server 402, mobile network 420, base station 422, client computing device 604 and webcam/camcorder 608A, or a different combination of these and other components. Sub-modules could also be implemented as modules communicatively coupled to other modules rather than included within parent modules. Additionally, it should be noted that one or more modules could be combined into a single module providing aggregate functionality. For instance, tracking module 414 can include playback module 416, or vice versa, to facilitate recording a remote control session and playback of the recorded session by way of a single module. The modules can also interact with one or more other modules not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 8:
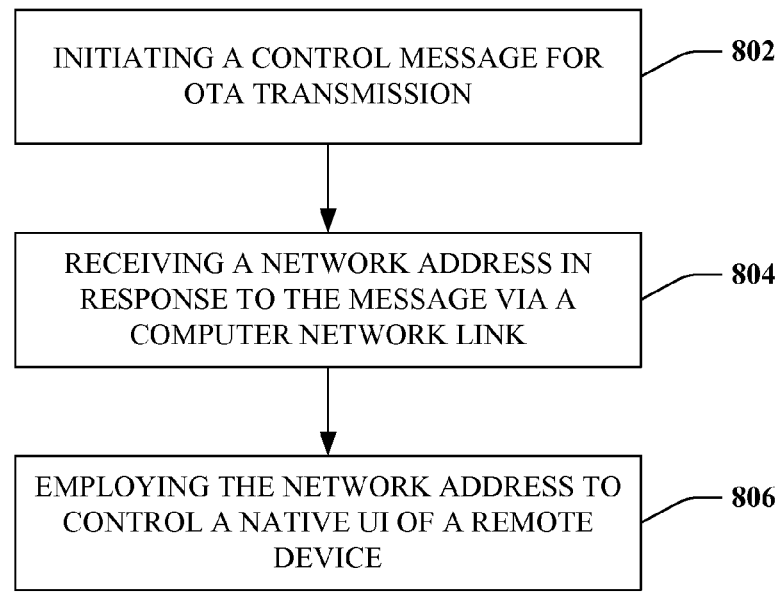
FIG. 8 illustrates a flowchart of an example methodology for employing a mobile network to facilitate remote control of electronic devices.
Figure 9:
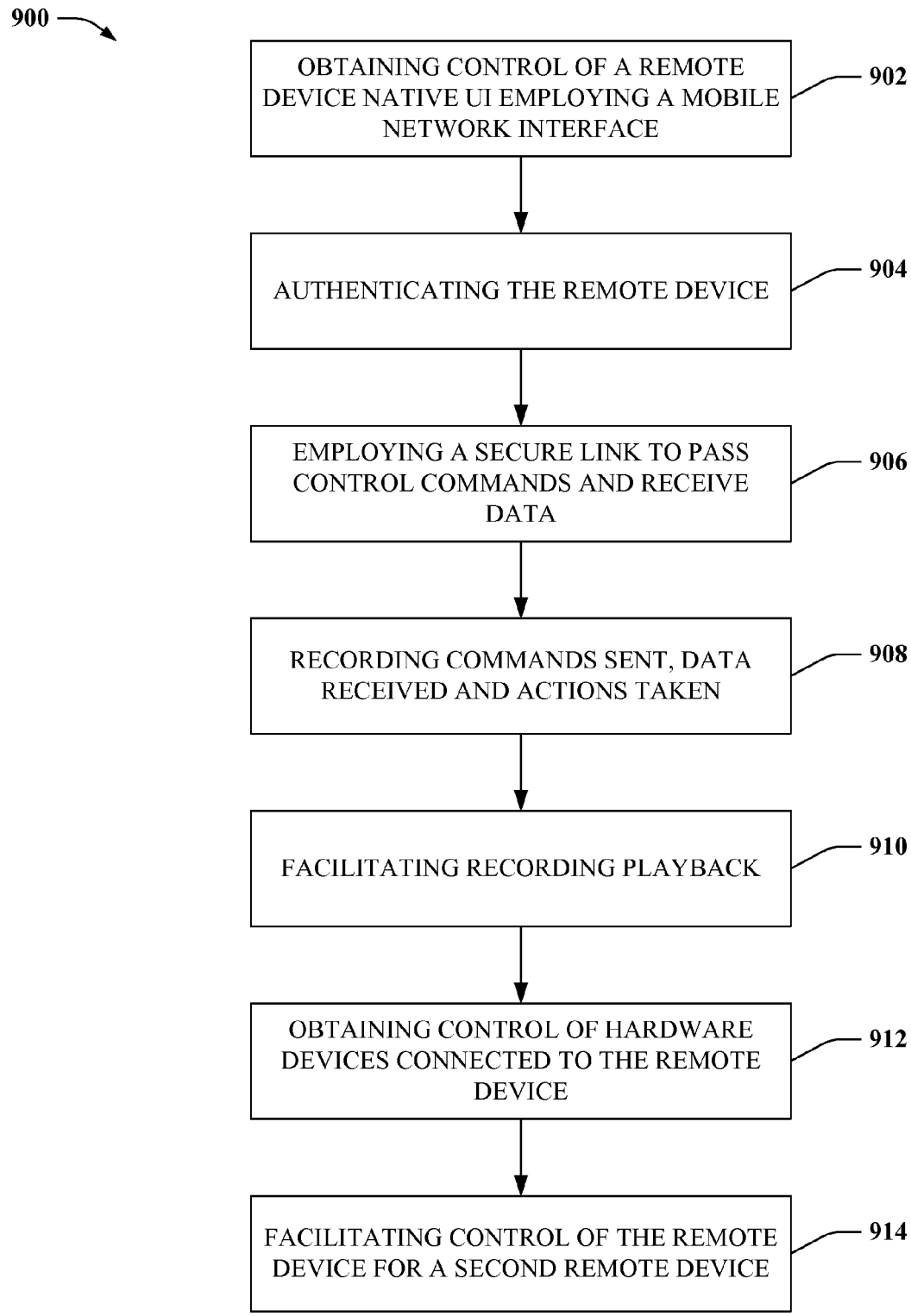
FIG. 9 depicts a flowchart of a sample methodology for enabling remote automation of electronic devices via a user terminal according to some aspects.
Figure 10:
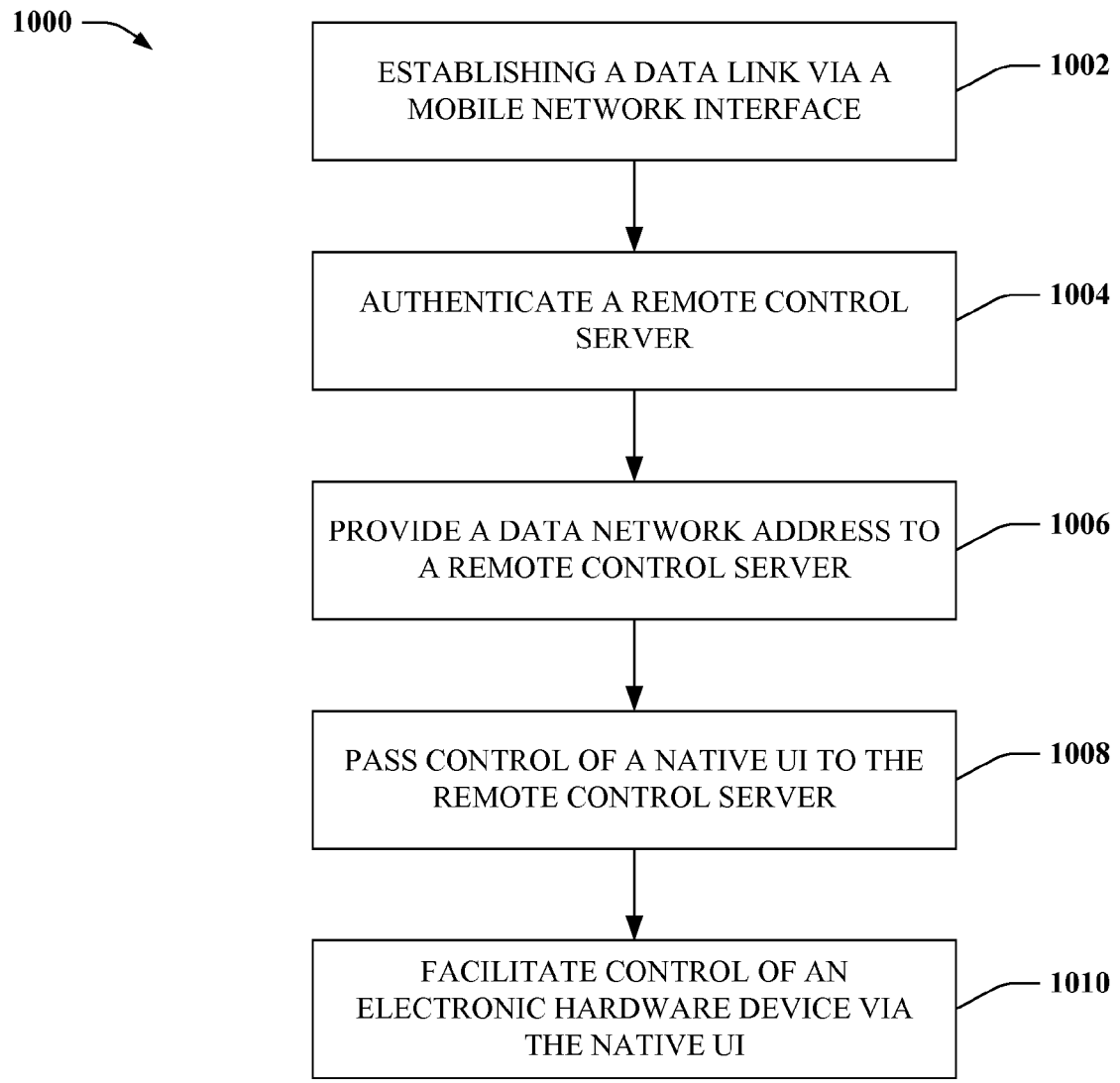
FIG. 10 illustrates a flowchart of an example methodology for facilitating remote control of a device according to further aspects disclosed herein.

In view of the exemplary systems described supra, methodologies that may be implemented in accordance with the disclosed subject matter will be better appreciated with reference to the flowcharts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 8 illustrates a flowchart of an example methodology 800 for initiating control of a remote wireless communication device according to aspects of the subject disclosure. At 802, method 800 can initiate a control message for OTA transmission to a target device. The control message can be a stream of data generated for transmission by a base station of an RAN, or a data packet that can be packaged into an OTA message by such a base station. The control message can comprise a request to initiate control of the target device. At 804, method 800 can receive a network address in response to the control message. The network address can be associated with a data call session maintained by the target device and transmitted in response to the control message. Moreover, the network address can be utilized to facilitate remote control of the target device utilizing the data call session as a communication interface. Thus, at 806 method 800 can employ the network address to submit input and commands to the target device and receive data from the target device in response to the input and commands. In some aspects, the input, commands and responses can be in a format native to a UI of the target device. Accordingly, in such aspects, controlling the target device can be implemented remotely in a manner substantially identical to controlling the target device via the target device's UI. Thus, method 800 can facilitate remote testing, troubleshooting and/or utilization of the target device. Additionally, because the data call session that facilitates communication with the target device can utilize a RAN of a mobile communication network, an active data link need not be maintained by the target device. Rather, the RAN can page the target device to deliver the control request message and result in initiation of the data call session.

FIG. 9 depicts a flowchart of a sample methodology 900 for enabling remote automation of electronic devices via a user terminal according to some aspects. At 902, method 900 can obtain control of a native UI of a remote device by employing, at least in part, a mobile network interface, as described herein. At 904, method 900 can authenticate the remote device. Authentication can be utilized to verify identity and authorization of the remote device for a remote control session. As an example, the authentication can comprise obtaining a digital signature of the remote device and verifying the digital signature with a public key associated with such device.

At 906, method 900 can employ a secure link to pass control commands to the remote device and receive responses and data from the remote device. The secure link can utilize an active data session maintained by the remote device, and can further comprise a VPN, SSL, session security, or the like. According to some aspects, the control commands and responses can be in a format native to a UI of the remote device, as described herein.

At 908, method 900 can record commands issued, data responses received, and actions taken by the remote device. The recording can write the commands/responses/actions to a log file, to a macro script, or the like. Additionally, media data sent in response to the commands can be recorded and linked to the log file or macro script. The media data can comprise audio/video streams, output display data, and the like. Thus, the recording can provide a mechanism for reviewing a control session. Furthermore, at 910, method 900 can facilitate playback of a recorded control session. The playback can be conducted at a user interface of a controlling device (e.g., control server, such as a computer, mobile phone, or the like configured to remotely control a target device). Alternatively, or in addition, playback can be facilitated by writing the recording to a playable media, text and/or script file and transmitting the file to an external playback device.

At 912, method 900 can obtain control of hardware devices connected to the remote device. For instance, in response to a command, the remote device can provide a list of peripheral devices, or other electronic or electrically-controlled components communicatively and/or operatively coupled with the remote device. Further, communication protocols required to operate such hardware devices (e.g., commands, command formats, operational parameters, parameter values, parameter states, and so on) can be obtained from the controlled remote device. The communication protocols can then be utilized to control the hardware devices.

At 914, method 900 can optionally facilitate control of the remote device for a second device. The facilitated control can be conditioned on verifying that the second device is authorized for such control, for instance. If control is granted, commands issued by the second device can be relayed to the remote device, and data, responses and actions taken by the remote device can be relayed to the second device. Accordingly, method 900 can enable a remote controller (e.g., the second device) to log into a network server (facilitating the control) and control the remote device via the network server.

FIG. 10 illustrates a flowchart of an example methodology 1000 for facilitating remote control of a device according to further aspects disclosed herein. At 1002, method 1000 can establish a data link via a mobile network interface. The data link can utilize, for instance, a packet-enabled service of a mobile network that provides a data network address suitable for packet communication. At 1004, method 1000 can authenticate a remote server suitable to control the device, as described herein. At 1006, method 1000 can provide the data network address to the remote server upon successful authentication. At 1008, method 1000 can pass control of a native UI of the device to the remote control server. At 1010, method 1000 can facilitate control of an electronic hardware device coupled to the device via the native UI. In some aspects, the electronic hardware device can be integrated with the controlled device. An example can be a camera or video camera (hardware device) of a mobile phone (controlled device). In other aspects, the electronic hardware device can be a peripheral device communicatively and/or operatively coupled with the controlled device, such as an external camera, webcam, lighting fixture, television, electronic metering device, and so on, as described herein. Thus, method 1000 can facilitate remote testing of a controlled device, automation of peripheral components attached to the device, or the like.

Figure 11:
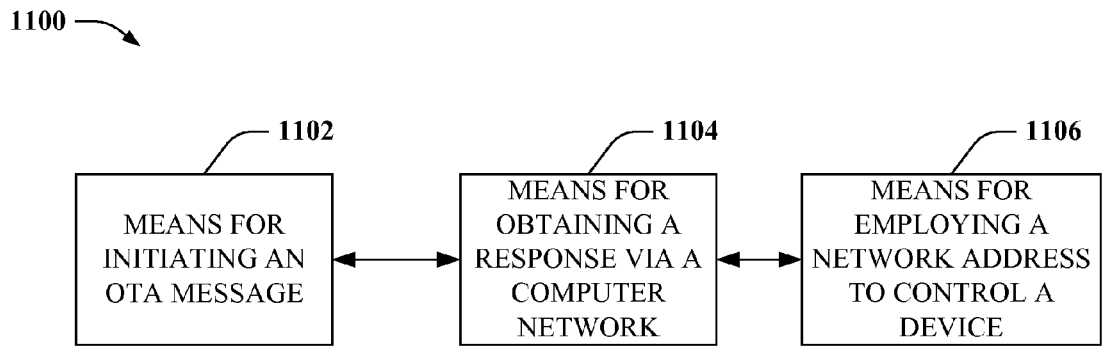
FIGS. 11 and 12 depict block diagrams of example systems that provide and facilitate, respectively, remote control of a device via a mobile network interface.
Figure 12:
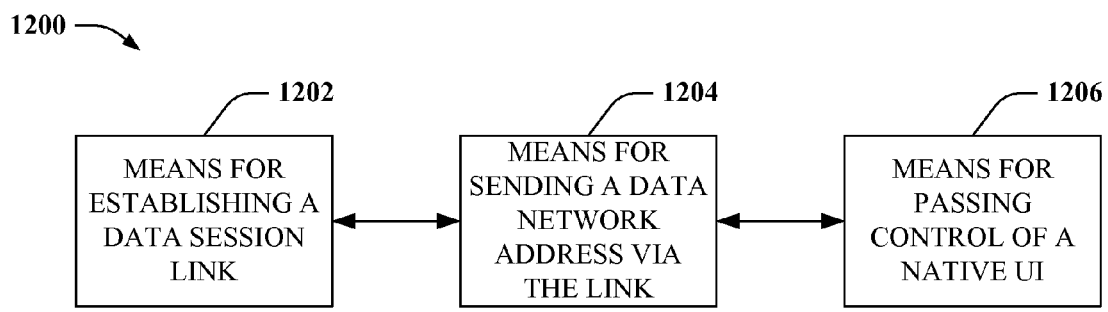

FIGS. 11 and 12 depict block diagrams of example systems 1100, 1200 that implement control and facilitate control, respectively, of a remote device at least in part via a mobile network interface. For example, systems 1100, 1200 can reside at least partially within a wireless communication network and/or within a transmitter such as a node, base station, access point, user terminal, personal computer coupled with a mobile interface card, or the like. It is to be appreciated that systems 1100, 1200 are represented as including functional blocks, which can be functional blocks that represent functions implemented by a processor, software, or combination thereof (e.g., firmware).

Regarding system 1100, a first module 1102 for initiating an OTA message is provided. The OTA message can include a request for control of a remote device. Additionally, the OTA message can comprise a network address associated with system 1100 with which the remote device can utilize to respond to the OTA message. Additionally, system 1100 can comprise a module 1104 for obtaining a response from the remote device via a computer network interface (e.g., the Internet). The response can include a network address of the remote device with which system 1100 can exchange data with such device. Furthermore, a module 1106 for employing the network address to control the remote device is provided. The module 1106 can issue commands, operational parameters, and the like, and receive responses, data, and actions of the remote device via the computer network interface. In some aspects, commands and parameters sent and responses and data received can be in a native UI format of the remote device. Accordingly, system 1100 can control such device remotely in a substantially identical manner as can be achieved utilizing the UI of the remote device.

Regarding system 1200, a first module 1202 for establishing a data session link is provided. The data session link can be initiated in response to receiving a request for remote control of system 1200 or of a device coupled with system 1200. Alternatively, the data session link can be initiated based on an input at such device or execution of a client application that facilitates such remote control of system 1200. In addition to the foregoing, system 1200 can include a module 1204 for sending a data network address to a remote control server. In some aspects, sending the network address can be conditioned on proper authentication of the control server (e.g., verifying a digital signature of such control server). The network address can be an IP address, in some instances, or another suitable address for routing data on a network. Additionally, a module 1206 for passing control of a native UI of a controlled device is provided. The module 1206 can receive, process and respond to commands issued by the remote control server utilizing the data session link. In some aspects, control can be passed by suspending inputs to the controlled device at the native UI. Alternatively, such inputs can be processed in conjunction with the commands issued by the remote control server. Upon completion of the control session, the module 1206 can refrain from processing further commands from the remote control server, close the data session link, or both.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:
1. A method for remote communication, comprising:
initiating a message sent at least in part over-the-air (OTA), the message configured for accessing a remote device to perform remote testing;
receiving a response to the message via a computer network link from the remote device, the response comprising a network address of the remote device, wherein the network address is a dynamic network address associated with the remote device;
employing the network address to control a user interface (UI) of the remote device over the computer network link;
passing command data to the remote device to implement control of or input to the UI, wherein the command data is in a format that is native to the UI and also native to an operating system of the remote device;
obtaining control of a hardware device that is communicatively coupled with the remote device; and
controlling operation of the hardware device by submitting a command native to the hardware device via the computer network link to the remote device.

2. The method of claim 1, further comprising initiating a mobile network data call to establish the computer network link.

3. The method of claim 1, further comprising providing a network address of a control server in the message that is sent at least in part OTA to the remote device.

4. The method of claim 1, further comprising authenticating the remote device based at least in part on data contained in the response.

5. The method of claim 1, further comprising employing a secure connection for the computer network link.

6. The method of claim 5, further comprising employing secure socket layer, session security or a virtual private network as the secure connection.

7. The method of claim 1, further comprising:
receiving response data from the remote device to implement feedback from or output from the UI.

8. The method of claim 7, further comprising recording the command data sent to the remote device or the response data received from the remote device during control of the UI of the remote device.

9. The method of claim 8, further comprising facilitating playback of the recording during or upon expiration of control of the UI.

10. The method of claim 1, further comprising:
issuing a command to the remote device that is native to a hardware media component coupled with the remote device; and
obtaining audio, video, or photographic media from the remote device or the hardware media component in response to the command.

11. The method of claim 1, further comprising passing control of the UI of the remote device to a second device by providing the network address of the remote device to the second device.

12. An apparatus for remote communication, comprising:
a communication processor that initiates a message sent at least in part OTA, the message configured for accessing a remote device to perform remote testing;
a computer network interface that receives a response from the remote device to the message comprising a network address of the remote device, wherein the network address is a dynamic network address; and
a server control module that employs the network address to control a UI of the remote device over a computer network link coupled to the interface, that passes command data to the remote device to implement control of or input to the UI, wherein the command data is in a format that is native to the UI and also native to an operating system of the remote device, wherein the server control module obtains control of a hardware device that is communicatively coupled with the remote device; and the server control module controls operation of the hardware device by submitting a command native to the hardware device via the computer network link to the remote device.

13. The apparatus of claim 12, wherein the computer network interface comprises an OTA interface that establishes the computer network link via an OTA connection to a data-enabled mobile network.

14. The apparatus of claim 12, the communication processor provides a network address of a control server in the message sent to the remote device.

15. The apparatus of claim 12, further comprising a security module that authenticates the remote device based at least in part on data contained in the response.

16. The apparatus of claim 12, further comprising:
a secure interface that couples the computer network interface to a secure connection;
instructions for encrypting or decrypting data; and
secure memory for storing the instructions.

17. The apparatus of claim 16, the secure connection comprises secure socket layer, session security or a virtual private network.

18. The apparatus of claim 12, wherein:
the server control module receives response data from the remote device via the computer network link to implement feedback from or output from the UI.

19. The apparatus of claim 18, further comprising a tracking module that records the command data sent to the remote device or the response data received from the remote device during control of the UI of the remote device.

20. The apparatus of claim 19, further comprising a playback module that plays or outputs in a media readable format the recording during or upon expiration of control of the UI.

21. The apparatus of claim 12, wherein:
the server control module issues a command to the remote device that is native to a hardware media component coupled with the remote device; and
the server control module obtains via the computer network interface audio, video, or photographic media in response to the command.

22. The apparatus of claim 12, further comprising a relay module that at least one of:
passes control of the UI of the remote device to a second device by providing the network address of the remote device to the second device; or
acts as a communication relay for data exchange between the remote device and the second device.

23. An apparatus for remote communication, comprising:
means for initiating a message sent at least in part OTA, the message configured for accessing a remote device to perform remote testing;
means for receiving a response to the message via a computer network link from the remote device, the response comprising a network address of the remote device, wherein the network address is a dynamic network address;
means for employing the network address to control a UI of the remote device over the computer network link;
means for passing command data to the remote device to implement control of or input to the UI, wherein the command data is in a format that is native to the UI and also native to an operating system of the remote device;
means for obtaining control of a hardware device that is communicatively coupled with the remote device; and
means for controlling operation of the hardware device by submitting a command native to the hardware device via the computer network link to the remote device.

24. A processor configured for remote communication, comprising:
- a first module that initiates a message sent at least in part OTA, the message configured for accessing a remote device to perform remote testing;
- a second module that receives a response to the message via a computer network link from the remote device, the response comprising a network address of the remote device, wherein the network address is a dynamic network address;
- a third module that employs the network address to control a UI of the remote device over the computer network link;
- a fourth module that passes command data to the remote device to implement control of or input to the UI, wherein the command data is in a format that is native to the UI and also native to an operating system of the remote device;
- a fifth module that obtains control of a hardware device that is communicatively coupled with the remote device; and
- a sixth module that controls operation of the hardware device by submitting a command native to the hardware device via the computer network link to the remote device.

25. A non-transitory device-readable medium comprising:
device-readable instructions configured for remote communication, the instructions are executable by at least one device to:
- initiate a message sent at least in part OTA, the message configured for accessing a remote device to perform remote testing;
- receive a response to the message via a computer network link from the remote device, the response comprising a network address of the remote device, wherein the network address is a dynamic network address;
- employ the network address to control a UI of the remote device over the computer network link;
- pass command data to the remote device to implement control of or input to the UI, wherein the command data is in a format that is native to the UI and also native to an operating system of the remote device;
- obtain control of a hardware device that is communicatively coupled with the remote device; and
- control operation of the hardware device by submitting a command native to the hardware device via the computer network link to the remote device.

26. A method for remote communication, comprising:
- establishing a data session link via a mobile access network interface to perform remote testing;
- providing, from a client device, a data network address to a remote control server at least in part via the data session link;
- obtaining a dynamic network address in conjunction with establishing the data session link;
- passing control of a UI to the remote control server;
- receiving command data from the remote control server to implement control of or input to the UI, wherein the command data is in a format that is native to the UI and also native to an operating system of the client device;
- communicatively coupling to a hardware device;
- facilitating control of the hardware device at the remote control server via the data session link; and
- facilitating operation of the hardware device by the remote control server submitting a command native to the hardware device via the computer network link to the remote device.

27. The method of claim 26, further comprising employing the dynamic network address as the data network address.

28. The method of claim 16, further comprising obtaining the data network address in connection with establishing the data session link.

29. The method of claim 26, further comprising obtaining an OTA message requesting the passing control of the UI, wherein establishing the data session link or providing the data network address are in response to obtaining the OTA message.

30. The method of claim 29, further comprising outputting a remote control request query and conditioning providing the data network address or passing control of the UI on a response to the query.

31. The method of claim 26, providing the data network address further comprises, at least in part, employing a secure link for data exchange with the remote control server.

32. The method of claim 26, further comprising authenticating the remote control server and conditioning providing the data network address on the authentication.

33. The method of claim 26, providing the data network address further comprises encrypting the data network address.

34. The method of claim 26, further comprising:
performing actions or providing data in response to receiving the command data.

35. The method of claim 34, further comprising at least one of:
- tracking the command data, the actions and the data in response to receiving the command data and saving tracked information to memory; or
- obtaining from the remote control server a recording of the command data, the actions and the data in a playable format.

36. An apparatus for remote communication, comprising:
- an OTA interface that establishes a data session link via a mobile access network interface to perform remote testing and that receives command data from a remote control server to implement control of or input to a user interface (UI), wherein the command data is in a format that is native to the UI and also native to an operating system of the apparatus;
- a client control module that provides, from the apparatus, a data network address to the remote control server at least in part via the data session link, wherein the data network address is a dynamic address associated with the apparatus for the data session link;
- a routing module that passes control of the UI of the apparatus to the remote control serve; and
- a device interface that facilitates operational data exchange with one or more hardware devices communicatively coupled with the apparatus, and facilitates operational control of the one or more hardware devices by the remote control server submitting a command native to the one or more hardware devices via the computer network link to the apparatus.

37. The apparatus of claim 36, further comprising a media controller that facilitates exchange of media information between the hardware devices or the apparatus and the remote control server.

38. The apparatus of claim 36, wherein the hardware device(s) comprises at least one of:
a web cam;
a video camera;
a mobile phone;
a traffic light;
a surveillance camera;

a night vision camera;
a lighting fixture;
a sprinkler system;
a television set;
a radio;
an electronic hardware device;
an appliance meter comprising an electronic controller;
a water meter;
a gas meter;
an oil meter, or a combination thereof.

39. The apparatus of claim 36, wherein the apparatus is at least one of:
a personal computer;
a laptop computer;
a personal digital assistant (PDA);
a mobile phone; or
a wireless communication device.

40. The apparatus of claim 36, further comprising a security module that facilitates secure communication between the apparatus and the remote control server.

41. The apparatus of claim 36, further comprising:
a secure communication link at least in part coupling the apparatus and the remote control server;
a secure interface that mitigates unauthorized access to data exchanged with the remote control server via the OTA interface;
instructions for encrypting or decrypting data exchanged with the remote control server; and
secure memory for storing the instructions.

42. The apparatus of claim 36, the OTA interface comprises a cellular modem.

43. The apparatus of claim 36, further comprising a query module that outputs a remote control request query and conditions providing the data network address or passing control of the UI on obtaining a response to the query.

44. The apparatus of claim 36, wherein:
the client control module performs actions or provides data in response to receiving the command data.

45. The apparatus of claim 44, further comprising a tracking module that at least one of:
monitors the command data, the actions and the data in response to receiving the command data and saves monitored information to memory; or
obtains from the remote control server a recording of the command data, the actions and the data in a playable format.

46. An apparatus for remote communication, comprising:
means for establishing a data session link via a mobile access network interface to perform remote testing;
means for providing, from the apparatus, a data network address to a remote control server at least in part via the data session link, wherein the data network address is a dynamic address associated with the apparatus for the data session link;
means for passing control of a UI to the remote control server;
means for receiving command data from the remote control server to implement control of or input to the UI, wherein the command data is in a format that is native to the UI and also native to an operating system of the apparatus;
means for communicatively coupling to a hardware device; and
means for facilitating control of the hardware device at the remote control server via the data session link, and facilitating operation of the hardware device by the remote control server submitting a command native to the hardware device via the computer network link to the remote device.

47. A processor for remote communication, comprising:
a first module that establishes a data session link via a mobile access network interface to perform remote testing;
a second module that provides, from a client device, a data network address to a remote control server at least in part via the data session link, wherein the data network address is a dynamic address associated with the processor for the data session link;
a third module that passes control of a UI to the remote control server; and
a fourth module that receives command data from the remote control server to implement control of or input to the UI, wherein the command data is in a format that is native to the UI and also native to an operating system of the processor;
a fifth module that communicatively couples to a hardware device;
a sixth module that facilitates control of the hardware device at the remote control server via the data session link, and
a seventh module that facilitates operation of the hardware device by the remote control server submitting a command native to the hardware device via the computer network link to the remote device.

48. A non-transitory device-readable medium, comprising:
device-readable instructions configured for remote communication, the instructions are executable by at least one device to:
establish a data session link via a mobile access network interface to perform remote testing;
provide, from a client device, a data network address to a remote control server at least in part via the data session link, wherein the data network address is a dynamic address associated with the device-readable medium for the data session link;
pass control of a UI to the remote control server;
receive command data from the remote control server to implement control of or input to the UI, wherein the command data is in a format that is native to the UI and also native to an operating system of the at least one device;
communicatively couple to a hardware device;
facilitate control of the hardware device at the remote control server via the data session link; and
facilitate operation of the hardware device by the remote control server submitting a command native to the hardware device via the computer network link to the remote device.

* * * * *